Oct. 16, 1923.
F. C. HANKER
1,470,730
ELECTRIC REGULATOR SYSTEM
Filed June 25, 1920
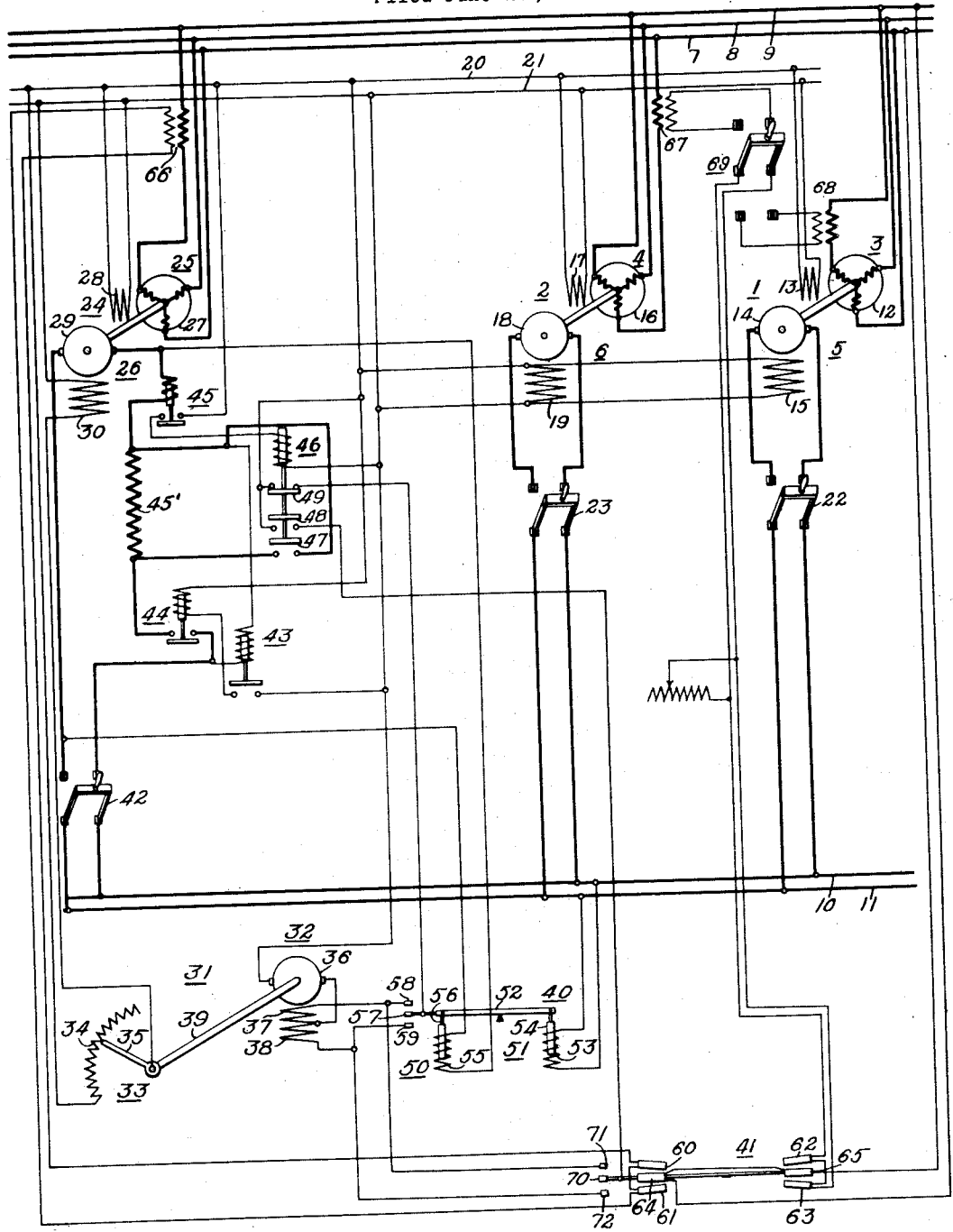
WITNESSES:
J. A. Helsel
W. B. Wells
INVENTOR
Frederic C. Hanker
BY
Wesley J. Carr
ATTORNEY Patented Oct. 16, 1923.

1,470,730

UNITED STATES PATENT OFFICE.

FREDERIC C. HANKER, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC REGULATOR SYSTEM.

Application filed June 25, 1920. Serial No. 391,565.

*To all whom it may concern:*

Be it known that I, FREDERIC C. HANKER, a citizen of the United States, and a resident of Wilkinsburg, in the county of Allegheny and State of Pennsylvania, have invented a new and useful Improvement in Electric Regulator Systems, of which the following is a specification.

My invention relates to regulator systems and, particularly, to regulator systems for governing the operation of dynamo-electric machines.

One object of my invention is to provide a regulator system that shall equalize the voltages of a generator and a feeder circuit before connecting the generator to the feeder circuit and that, upon connecting the generator to the feeder circuit, shall automatically control the percentage of load which is carried by the generator.

In many electric systems, it is very often desirable to automatically connect auxiliary machines to load circuits and to control the percentage of the load carried by such machines. Thus, in a sub-station for an electric railway system, a number of machines, either rotary converters or motor-generators sets, are provided for transforming the transmitted alternating current into direct current for operating electric cars. The number of motor-generator sets in service is varied in accordance with the load on the feeder circuit and it is desirable, not only to connect the machines automatically to the feeder circuit, but, also, to automatically control the percentage of the load carried by such machines when connected to the feeder circuit.

In a regulator system constructed in accordance with my invention, a plurality of motor-generator sets are normally connected between a three-phase supply circuit and a direct-current-railway-feeder circuit. An auxiliary motor-generator set is provided which may be automatically connected to the feeder circuit when desired.

In practicing my invention, a motor-operated rheostat is provided for controlling the excitation of the generator in the auxiliary motor-generator set, and a regulator mechanism is provided for so controlling the motor-operated rheostat as to equalize the voltages of the auxiliary generator and the feeder circuit whenever it is desired to connect the auxiliary set to the feeder circuit.

The regulator mechanism preferably comprises two differentially related electromagnets which are respectively energized in accordance with the generator voltage and the feeder circuit voltage. Upon equalization of such voltages, a switch is operated for connecting the auxiliary generator, through a resistor, to the feeder circuit. When current flows from the auxiliary generator to the feeder circuit, a reverse-current relay is energized for operating a switch to short-circuit the resistor and to transfer the control of the motor-operated rheostat from the regulator mechanism to a second regulator mechanism which is controlled in accordance with the load upon the feeder circuit. The second regulator mechanism governs the excitation of the auxiliary generator to control the percentage of the feeder circuit load which is carried by it.

The single figure in the accompanying drawing is a diagrammatic view of a regulator system constructed in accordance with my invention.

Referring to the drawing, two main motor-generator sets 1 and 2, respectively comprising alternating-current motors 3 and 4 and direct-current generators 5 and 6, are normally connected between a three-phase supply circuit comprising conductors 7, 8 and 9 and a direct-current railway feeder circuit comprising conductors 10 and 11. The synchronous motor 3 of the motor-generator set 1 comprises a rotor 12 and a field-magnet winding 13, and the generator 5 of the motor-generator set 1 comprises an armature 14 and a field-magnet winding 15. The synchronous motor of the set 2 comprises a rotor 16 and a field-magnet winding 17, and the generator 6 of the set 2 comprises an armature 18 and a field-magnet winding 19. The field-magnet windings 13, 15, 17 and 19 of the motor-generator sets 1 and 2 are connected, in any suitable manner, to a direct-current supply circuit comprising conductors 20 and 21. Any suitable switches 22 and 23 are provided for connecting the armatures 14 and 18 of the generators 5 and 6 to the feeder conductors 10 and 11.

An auxiliary motor-generator set 24, comprising a synchronous motor 25 and a direct-current generator 26, is provided for assisting in carrying the feeder-circuit load under certain conditions. The synchronous motor 25 comprises a rotor 27, which is directly connected to the supply conductors 7, 8 and 9, and a field-magnet winding 28 which is connected to the direct-current supply conductors 20 and 21. The generator 26 comprises an armature 29, which is connected to the supply conductors 10 and 11, in a manner hereinafter set forth, and a field-magnet winding 30 which is connected to the supply conductors 20 and 21 through a motor-operated rheostat mechanism 31.

The rheostat mechanism 31 comprises a motor 32 and a rheostat 33. The rheostat 33 embodies a resistor 34 and a rheostat arm 35. The motor 32 comprises an armature 36 and two differentially related field-magnet windings 37 and 38. The armature 36 is connected to the rheostat arm in any suitable manner, as by means of a shaft 39. The motor-operated rheostat 31 is controlled either by a voltage regulator mechanism 40 or a watt regulator mechanism 41.

A suitable hand-operated switch 42 is provided in the circuit between the armature 29 of the auxiliary generator and the feeder-circuit conductors 10 and 11. A no-voltage relay 43 is provided between the armature 29 and the feeder-circuit conductors 10 and 11 to complete an energizing circuit for a switch 44, upon equalization of the voltages of the generator and the feeder circuit. The relay 43 connects the energizing coil of the switch 44 directly to the direct-current supply conductors 20 and 21. The switch 44 connects the armature 29 through the coil of a reverse-current relay 45 and a resistor 45' to the feeder-circuit conductors 10 and 11. Upon flow of any current from the auxiliary generator 26, the reverse-current relay is operated to connect the energizing coil of a switch 46 across the supply conductors 20 and 21. The switch 46 comprises a switch member 47 for short-circuiting the resistor 45' and two switch members 48 and 49 for controlling the connection of the regulator mechanisms 40 and 41 to the rheostat mechanism 31.

The voltage regulator mechanism 40 comprises two electromagnets 50 and 51 and a contact arm 52. The electromagnet 51 embodies a coil 53, which is connected across the conductors 10 and 11 of the feeder circuit, and a core armature 54 which is pivotally connected to the contact arm 52. The electromagnet 50 comprises a coil 55, which is connected across the terminals of the auxiliary armature 29, and a core armature 56 which is pivotally connected to the contact arm 52. The contact arm 52 carries a contact member 57 which is selectively movable into engagement with stationary contact members 58 and 59 according to the energization of the electromagnets 50 and 51. The movable contact member 57 is connected to the direct-current supply conductor 20 by means of the switch member 49 of the switch 46. The stationary contact members 58 and 59 are respectively connected to the field-magnet windings 37 and 38. When the switch 46 is in the released position, as shown, the regulator mechanism 40 serves to operate the rheostat motor 32 in a clockwise and in a counter-clockwise direction for decreasing and for increasing the excitation of the auxiliary generator 26 to equalize the voltage between such generator and the feeder circuit.

The watt regulator mechanism 41 is constructed similarly to an ordinary Kelvin balance and is controlled in accordance with the watts supplied by the main and the auxiliary motor-generator sets. The regulator mechanism 41 comprises four stationary coils 60 to 63, inclusive, and two movable coils 64 and 65. The two stationary coils 60 and 61 are connected to a current transformer 66 in order to be energized in accordance with the current supplied to the auxiliary motor-generator set 24. The two stationary coils 62 and 63 are connected, either to a current transformer 67 or to a current transformer 68, in order to be energized in accordance with the current supplied to one of the motor-generator sets 2 and 1. Any suitable switch, such as the two-pole double-throw switch 69, is provided for connecting the stationary coils 62 and 63 to the current transformers 67 and 68. The movable coils 64 and 65 are connected between the supply conductors 7 and 9 in order to be energized in accordance with the voltage of the three-phase supply circuit. The movable coils 64 and 65 carry a movable contact member 70 which is moved into engagement with stationary contact members 71 and 72 according to the energization of the various coils of the regulator mechanism. From the connections above set forth for the various coils of the regulator mechanism 41, it is apparent that the contact member 70 is operated in accordance with the load carried by the motor-generator set and the load carried by either of the two motor-generator sets 1 and 2. The movable contact member 70 is connected to the direct-current supply conductor 20 by means of the switch member 48 when the switch 46 is in an operative position. The switch 46, as above set forth, is operated when the voltages of the auxiliary generator 26 and the feeder circuit are equalized. The stationary contact members 71 and 72 are respectively connected to the field-magnet windings 37 and 38. The regulator mechanism 41 serves to control the operation of the rheostat motor 32 in a clockwise and in a counter-clockwise direction when the auxiliary generator 26 is connected to the feeder circuit. The rheostat motor controls the excitation of the auxiliary generator to govern the percentage of the feeder-circuit load that is carried by the auxiliary motor-generator set.

If it is desired to connect the generator 26 of the auxiliary motor-generator set 24 to the feeder circuit, the switch 42 is closed. The regulator mechanism 40, which is differentially operated in accordance with the voltages of the auxiliary generator 26 and the feeder circuit, operates the rheostat mechanism 31 until such voltages are equalized. Upon equalization of the voltages of the auxiliary generator 26 and the feeder circuit, the no-voltage relay 43 is operated for completing the energizing circuit of the switch 44. Upon operation of the switch 44, a circuit is completed from the feeder conductor 11 through the switch 42, armature 29, coil of the reverse-current relay 45, resistor 45', switch 44 and the switch 42 to the feeder-circuit conductor 10. Upon any flow of current from the auxiliary generator 26, the reverse-current relay 45 is operated to energize the coil of the switch 46 from the supply conductors 20 and 21. The switch member 47 short-circuits the resistor 45' for connecting the auxiliary generator directly to the feeder-circuit conductors 10 and 11, and the switch members 48 and 49 transfer the control of the auxiliary generator excitation from the voltage regulator mechanism 40 to the watt regulator mechanism 41.

The regulator mechanism 41 is differentially operated in accordance with the watts supplied to the auxiliary motor-generator set 24 and the watts supplied to one of the two motor-generator sets 1 and 2. The regulator mechanism, as heretofore set forth, controls the rheostat mechanism 31 to govern the excitation of the auxiliary generator 26. Accordingly, the regulator mechanism 41 may be adjusted to place any desired percentage of the feeder-circuit load upon the auxiliary motor-generator set, as indicated by the rheostat 45.

Modifications in the system and in the construction and arrangement of the parts may be made within the spirit and scope of my invention, and such modifications are intended to be covered by the appended claims.

I claim as my invention:—

1. In a regulator system, the combination with an alternating-current supply circuit, a direct-current feeder circuit, main motor-generator sets connected between said circuits, and an auxiliary motor-generator set adapted to be connected in parallel with said main sets, of means for automatically controlling the voltage of the auxiliary set and for connecting it in circuit with the main sets, and means for automatically controlling the percentage of load carried by the auxiliary set.

2. In a regulator system, the combination with a plurality of main motor-generator sets, and an auxiliary motor-generator set, of means for automatically equalizing the voltages of said motor-generator sets and for connecting the auxiliary set in parallel with the main sets, and means for automatically controlling the percentage of the load carried by the auxiliary set.

3. In a regulator system, the combination with a feeder circuit and a generator adapted to be connected to said circuit, of means for equalizing the voltages of the generator and the feeder circuit, means for connecting the generator to the feeder circuit upon equalization of such voltages, and means for controlling the percentage of load carried by said generator.

4. In a regulator system, the combination with a motor-generator set, an alternating-current supply circuit connected to the motor of said set, and a direct-current feeder circuit adapted to be connected to the generator of said set, of means for automatically balancing the voltage between the generator and said direct-current circuit and to connect the generator to such circuit, and means for varying the excitation of said generator to control the percentage of the load carried by it.

5. In a regulator system, the combination with a generator, a feeder circuit, and a resistor, of means for varying the excitation of said generator, means for controlling said exciting means to equalize the voltages of the generator and the feeder circuit, means, upon equalization of such voltages, for connecting the generator through said resistor to the feeder circuit, means for short-circuiting said resistor upon flow of current from said generator, and means for governing said exciting means to control the percentage of the feeder-circuit load carried by the generator.

6. In a regulator system, the combination with a feeder circuit and a generator adapted to be connected to the feeder circuit, of means for automatically equalizing the generator voltage with said circuit voltage and for connecting the generator to said circuit, and means for automatically controlling the percentage of feeder-circuit load carried by said generator.

7. In a regulator system, the combination with a plurality of main motor-generator sets and an auxiliary motor-generator set, of means for equalizing the voltages of said sets, means, upon equalization of such voltages, for automatically connecting the generator of the auxiliary set in parallel with the generators of the main sets, and means for automatically controlling the excitation of the auxiliary set to govern the percentage of load carried by such set.

8. In a regulator system, the combination with a plurality of main generators, an auxiliary generator, and a resistor, of automatic means for equalizing the voltages of said generators, means, upon equalization of such voltages, for automatically connecting the auxiliary generator through said resistor in parallel to the main generators, means for short-circuiting said resistor upon flow of current from the auxiliary generator, and means for governing the percentage of load carried by the auxiliary generator.

9. In a regulator system, the combination with a generator, and a feeder circuit, of automatic means for equalizing the voltages of the generator and the feeder circuit, for connecting the generator to the feeder circuit, and for controlling the percentage of load carried by the generator.

10. In a regulator system, the combination with a generator and a feeder circuit, of means comprising a magnet energized in accordance with the generator voltage and a second magnet energized in accordance with the feeder-circuit voltage for controlling the generator excitation to equalize such voltages, and means for automatically connecting said generator to the feeder circuit upon equalization of said voltages.

11. In a regulator system, the combination with a generator, a feeder circuit, and a resistor, of means comprising two magnets respectively energized in accordance with the generator voltage and the feeder-circuit voltage for varying the generator excitation to equalize said voltages, means, upon equalization of said voltages, for connecting the generator in series with said resistor to the feeder circuit, and means for short-circuiting said resistor upon flow of current from said generator.

12. In a regulator system, the combination with a feeder circuit, a plurality of main generators normally connected to the feeder circuit, and an auxiliary generator, of means comprising two magnets respectively energized in accordance with the auxiliary-generator voltage and the feeder-circuit voltage for varying the auxiliary-generator excitation to equalize said voltages, means, upon equalization of said voltages, for connecting the auxiliary generator to the feeder circuit, and means for controlling the percentage of the load carried by said auxiliary generator.

In testimony whereof, I have hereunto subscribed my name this 21st day of June 1920.

FREDERIC C. HANKER.